United States Patent

[11] 3,534,809

[72] Inventors Jean G. Charitat, Jr.
Fairfax;
Leland G. Mull, Vienna; John J. Turtora,
Fairfax, Virginia
[21] Appl. No. 766,824
[22] Filed Oct. 11, 1968
[45] Patented Oct. 20, 1970
[73] Assignee Radiation Systems Incorporated
McLean, Virginia
a corporation of Nevada

[54] TEMPERATURE MEASURING DEVICES
9 Claims, 3 Drawing Figs.
[52] U.S. Cl. ................................................ 165/26,
62/3, 73/359
[51] Int. Cl. .................................................. F25b 29/00
[50] Field of Search .......................................... 165/26, 27,
39, 40; 73/362(R), 359; 62/3

[56] References Cited
UNITED STATES PATENTS
3,367,186 2/1968 Ensign et al. ................. 73/362
3,447,376 6/1969 Turtora et al. ................. 73/359

*Primary Examiner*—Robert A. O'Leary
*Assistant Examiner*—Charles Sukalo
*Attorney*—Hurvitz, Rose & Greene

ABSTRACT: A system for measuring the temperature of a thermoelectric probe includes a thermoelectric transducer for sensing the temperature to which a temperature-sensitive element in a normally balanced bridge is subjected. The bridge is unbalanced to an extent determined by the deviation of the temperature to which the element is exposed from the temperature at which a condition of balance obtains. The output signals of probe and transducer are compared to produce a difference signal supplied to a control device for varying the temperature to which the temperature-sensitive element is exposed, in a direction to reduce the magnitude of the difference signal and hence the difference between the probe temperature and the element temperature. An indicating device is used to indicate the extent of unbalance of the bridge as a measure of the probe temperature.

Patented Oct. 20, 1970

3,534,809

INVENTORS
JEAN G. CHARITAT, Jr.
LELAND G. MULL
JOHN J. TURTORA

BY Hurvitz, Rose + Greene

ATTORNEYS 3,534,809

TEMPERATURE MEASURING DEVICES

BACKGROUND OF THE INVENTION

The present invention relates generally to temperature measuring devices, and more particularly to thermometric instrumentation employing a closed loop feedback system in conjunction with a bridge circuit to provide measurement accuracy commensurate with the precision of a null or balance reading device.

In the copending application of Turtora et al. Ser. No. 542,025, entitled "High Accuracy Temperature Measuring Devices", filed April 12, 1966 now U.S. Pat. No. 3,447,376 granted Jun. 3, 1969, of common assignee, the observation is made that a need exists for instruments capable of providing highly accurate measurements of temperature, for example at various points of the body in a human patient or other animal subject. It has been found that known temperature measuring devices are incapable of fulfilling the exacting, and sometimes conflicting, requirements of such instrumentation, hence presenting a deterrent to the full development of this research in the medical field and related fields of endeavor. For example, in addition to a requirement of measuring the temperature of a selected point in the human body to an accuracy of better than 0.02°C., a suitable device should be small, portable, rugged, self-contained, reliable, and relatively inexpensive.

According to the invention disclosed in the aforementioned Turtora et al. application, an electronic comparison is performed between signals representative of the temperatures of a thermal sensing probe and a secondary thermal standard, and the difference indication obtained from that comparison is used to provide a signal for controlling, via a closed loop feedback system, the temperature of the secondary standard to drive it to exactly equal the temperature of the probe. To the latter end, a temperature varying device is maintained in direct heat-transferring relationship with the thermally sensitive portion of the standard and responds to the control signal to apply or to remove heat therefrom. The temperature sought to be measured may then be accurately and conveniently ascertained from the secondary standard.

According to an embodiment of that invention, a thermoelectric transducer is employed as the probe to accurately sense the temperature to be measured and to produce an output signal representative of that temperature. The secondary standard comprises a mercury thermometer having associated therewith a temperature-varying element for controlling the temperature of the body or pool of mercury within the thermometer bulb and a further thermoelectric transducer for sensing the temperature of the mercury and for producing an output signal proportional to the latter temperature. The outputs of the two transducers are coupled in polarity-opposing relationship to produce an error signal for application to a closed loop feedback circuit to govern the sense of the variation exercised by the temperature-controlling element contacting the mercury pool in the thermometer. In this manner, any temperature difference between the probe and the thermometer is effective to produce an appropriate compensation of the mercury temperature to reduce the difference to zero. The thermometer reading is thereby maintained equal to and indicative of the probe temperature.

SUMMARY OF THE INVENTION

The present invention involves modifications of the invention disclosed in the aforementioned Turtora et al. application, particularly in respect to the arrangement by which a readout of the final temperature measurement is obtained. Briefly, according to an embodiment of the present invention, the secondary temperature standard is a calibrated, normally balanced (at a preselected temperature) bridge circuit containing a temperature sensitive element, such as a thermistor, which is subjected to temperature variation via a closed loop feedback system. The temperature sensitive element of the bridge circuit is imbedded or immersed in a thermally conductive medium together with a thermoelectric transducer and a temperature-varying device. An error signal representing the difference between the signal from a thermoelectric probe contacting the body whose temperature is to be measured and the thermoelectric transducer signal is fed back to the temperature-varying device, thereby changing the temperature to which the temperature sensitive element is subjected, and unbalancing the bridge circuit. The extent of this unbalance is a measure of the probe temperature. The temperature reading may be taken directly from the amount of deflection of a meter pointer, or may be a digital readout obtained from the output signal of the thermoelectric transducer, or may be taken from the calibrated dials associated with variable resistance elements in other arms of the bridge circuit when the bridge has been rebalanced (by reference to a null reading device associated with the bridge, e.g., a galvanometer).

When comparing the present invention to the prior art, it will be observed that the temperature sensitive element may be precalibrated on the basis of a primary standard to provide at least equal and possibly greater sensitivity than is available with a standard thermometer, and furthermore, that the placement of that element in one arm of an electrical resistance bridge permits direct readout from the output diagonal of the bridge on an instrument calibrated in terms of increments of a degree or degrees of a temperature scale. Deviation of the bridge from a normally balanced condition is therefore immediately readable in terms of temperature, and represents a deviation from that temperature at which the bridge was balanced (and at which a null indication existed).

The bridge galvanometer may be replaced with a remote indicating device such as a deflection instrument whose calibrated indication of temperature may be projected on a screen or otherwise displayed to an observer, or with a digital readout device prior to which the signal representative of deviation from balance (and thus of temperature variation, either positive or negative, from the calibration temperature at which the balance condition obtains) is amplified to magnify the reading.

In addition to the previously enumerated advantages, the present invention provides a calibrated readout device or standard upon which no limitation of size or complexity are imposed by the locale of the area in which the temperature is to be measured.

The objects and advantages of the aforementioned Turtora et al. application are also retained by virtue of retention of the comparison arrangement, the feedback loop, and the placement of temperature sensitive element, thermoelectric transducer, and temperature varying device in precisely the same thermal environment, viz., a heat conductive medium, such as a dielectric fluid or a thermally conductive metal, from which the various components are electrically insulated.

BRIEF DESCRIPTION OF THE DRAWINGS

The above and still further objects, features and attendant advantages of the present invention will become apparent from a consideration of the following detailed description of certain preferred embodiments thereof, especially when taken in conjunction with the accompanying drawings, in which.

DESCRIPTION OF THE PREFERRED EMBODIMENTS

Figure 1:
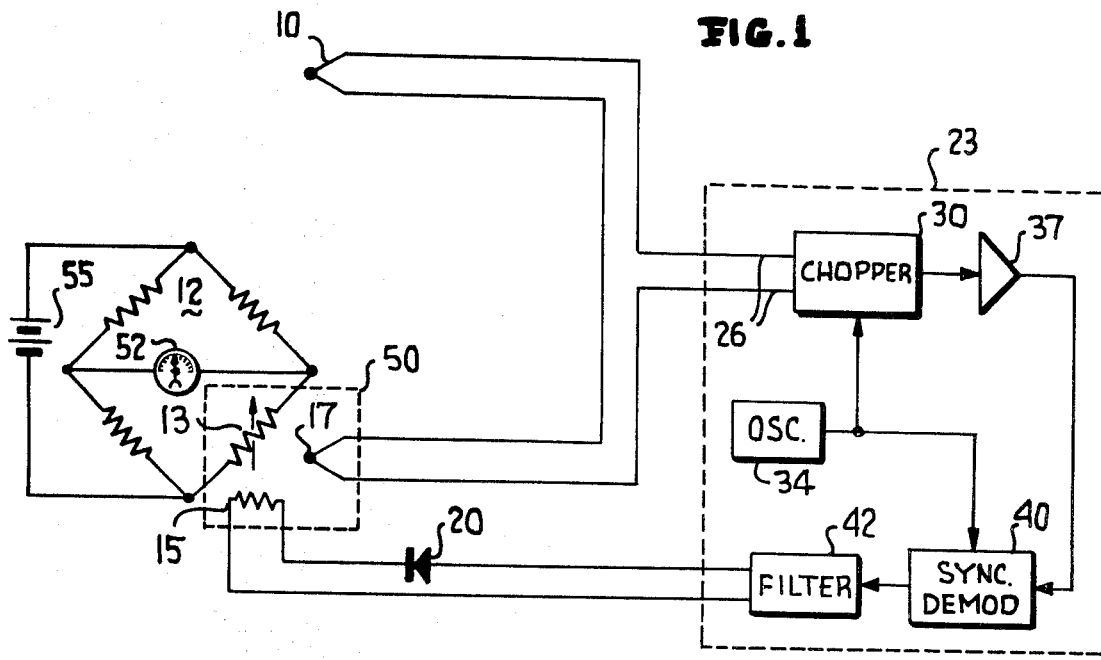
FIG. 1 is a circuit diagram of the overall temperature measuring system of the present invention.

Referring now to FIG. 1, one embodiment of a temperature measuring system in accordance with the present invention comprises a temperature sensor probe 10, such as a thermocouple probe wherein the thermocouple is placed in a probe loop, for example; a bridge circuit 12 having in one of its arms a precalibrated temperature sensitive element 13, such as a thermistor, whose resistance varies as a function of temperature; a heating element 15 for appropriately varying the temperature of the environment 50 in which the temperature sensitive element 13 is located; a thermoelectric transducer or sensor 17 in the form of a thermocouple that generally matches the characteristics of thermocouple 10 in the sensor probe, transducer 17 being located within environment 50 to detect the temperature of that environment as sensed by element 13, and to produce an output voltage representative of that temperature; a diode 20 to permit current flow in only one direction through heating element or heat pump 15; and an error amplifying, closed loop feedback unit 23.

Sensor probe thermocouple 10 and temperature sensing thermocouple 17 are connected in series opposition to provide to unit 23 on leads 26 and input voltage constituting the difference between the output voltages of the two thermocouples and representing the difference in temperatures to which they are subjected. If the temperature versus output voltage characteristics of the two thermocouples are matched, it will be apparent that the input voltage to unit 23 is zero when they are exposed to the same temperature. We have found, however, that an exact match of the thermocouples is not essential to obtaining an accurate temperature measurement. The difference voltage or error signal is applied to a chopper 30 which produces an AC signal at its output terminals, the latter signal having a frequency governed by the output frequency of an oscillator 34, which determines the chopping rate of the error signal. Conversion of the DC error signal to an AC signal permits the use of an AC amplifier 37, thereby obviating problems of drift normally associated with amplification of low level DC signals. The amplified AC signal is rectified by synchronous detector 40, in accordance with the output signal frequency of oscillator 34, and the detector output signal is filtered and smoothed by narrow bandwidth filter 42 to remove any noise or ripple present thereon. The resultant DC output is applied in opposite polarity, relative to the input error signal, to heater 15.

In operation, if the temperature sensed by thermocouple 10 is greater than that to which thermocouple 17 is subjected, current flows through heating element 15 until the temperature of the thermally conductive medium 50, as sensed by thermocouple 17, is equal to that detected by probe sensor thermocouple 10, at which time the error voltage becomes zero. Ordinarily the temperature of thermally conductive medium 50 will be less, initially, than that to which probe 10 is subjected when a measurement is to be taken; hence, current flow is ordinarily only in one direction through the heater. For a typical resistive heating element, such as is schematically depicted for element 15 in FIG. 1, the direction of current flow is obviously immaterial. However, the direction of current flow through certain types of temperature varying element can be critical to the proper direction of change of temperature. In that case, to avoid operation of the temperature varying element in the unstable region, should the temperature of medium 50 initially exceed the temperature to which sensor probe 10 is subjected, a diode 20 is connected in series circuit with the temperature varying element to prevent current flow therethrough under those conditions.

Temperature sensitive element 13, which is preferably a precalibrated thermistor whose resistance varies as a function of temperature, is imbedded or immersed in thermally conductive medium 50 and constitutes one arm of a calibrated normally balanced bridge circuit containing a null reading meter 52 as a diagonal of the bridge circuit. Medium 50 should be of a type that is capable of maintaining a uniform temperature throughout an extensive region thereof, such as that region within which thermocouple 17, heater element 15, and thermistor 13 are in close proximity, and is capable of responding rapidly to temperature variations. To this end, medium 50 is preferably a thermally conductive metal, such as aluminum, from which the several elements are electrically, but not thermally, insulated; or it may be a dielectric fluid, such as oil. Since gaseous environments do not tend toward uniformity of temperature, unless of relatively small volume, and in any case do not respond quickly to variations in flow of heat thereto or therefrom, medium 50 should be of nongaseous form.

Bridge 12 is balanced at a preselected temperature, depending upon the range of temperatures normally to be encountered by the probe 10, and, since it then contains fixed resistances in all but the arm containing thermistor 13, undergoes a condition of unbalance at any time thermistor 13 is exposed to a temperature differing from the balance temperature. To ensure that the other resistors in the bridge have no effect upon unbalance they should be of a precision, temperature-insensitive type, or should be located in an oven at the balance temperature and the oven thermally insulated from medium 50.

Electrical power is furnished to the bridge by a suitable long life battery 55, or, using rectifiers, may be obtained from a standard commercial outlet. A conventional voltage check may be provided to ascertain that the bridge supply voltage, particularly if obtained from a battery, is within tolerable limits prior to use.

In use, and with reference to the earlier discussion of operation, with bridge 12 balanced the indicator or pointer of null reading meter (e.g., galvanometer) 52 is directed toward a scale indicia designating the balance temperature. Positioning of probe 10 in a region whose temperature differs from the balance temperature will therefore produce an error signal which is converted to heat energy by heater 15 to appropriately vary the temperature of medium 50 until the error signal is driven to the zero level (by consequent variation of the output of thermocouple 17). With the change in temperature of medium 50, there is a change in resistance of thermistor 13 and a resultant displacement of the indicator of meter 52. When the temperature of medium 50 achieves a condition of equality with the temperature detected by probe 10, the indicator is steady and provides a highly accurate indication of temperature at probe 10, without any limitations of size or complexity imposed by the locale in which probe 10 is to be placed.

Figure 2:
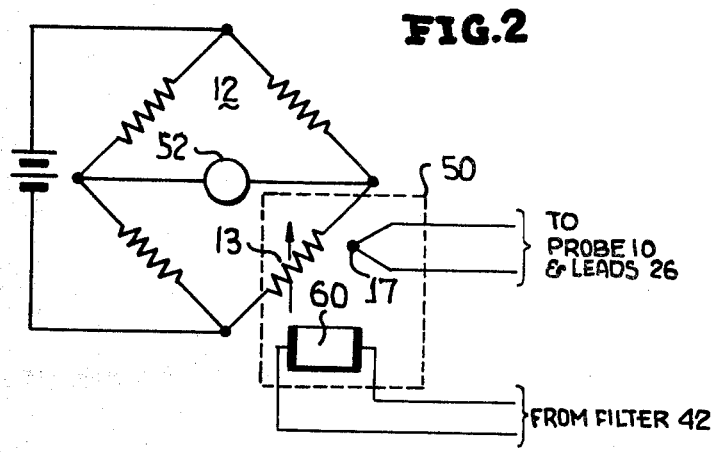
FIG. 2 is a circuit diagram of a modification of the temperature sensing, heating, and readout portion of the system of FIG. 1.

In the modification of FIG. 2, heater 15 is replaced by a thermal heat pump 60 capable of heating or cooling depending upon direction of current flow therethrough, such as the well known semiconductor devices exhibiting Thompson-Seebeck-Peltier effects. As previously noted, such an arrangement has the advantage that the ambient operating temperature range of the instrument may be extended by virtue of the linear bidirectional drive of the temperature control element. For example, probe 10 may be placed in an area whose temperature is below the initial temperature of medium 50, and medium 50 will then be cooled until it reaches the probe temperature.

Figure 3:
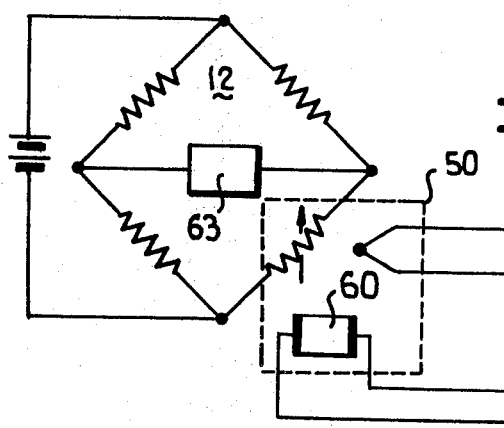
FIG. 3 is a circuit diagram of a further modification of the system of FIG. 1.

In FIG. 3, another modification of the invention is shown in which meter 52 is supplemented or replaced by a unit 63, such as a recording device (e.g., a paper chart recorder), or a remote indicating device (e.g., a digital readout display, or a deflection instrument).

The operation of the embodiments of FIGS. 2 and 3 is the same, except for the readout of temperature, and is generally similar to that described above with respect to the embodiment of FIG. 1. The principal difference, of course, is that the initial temperature of thermocouple 17 may be greater or less than that of thermocouple 10 because the error signal polarity determines direction of current flow through heating-cooling element 60 and will be appropriate to cause withdrawal or introduction of heat in medium 50.

We claim:
1. Apparatus for indicating the temperature to which a thermoelectric probe is subjected, said apparatus comprising:
a thermally conductive medium;
thermoelectric means in said thermally conductive medium for generating an electrical signal having an amplitude related to the temperature of said medium;

said thermoelectric probe and said thermoelectric means having at least substantially matched output signal amplitude-versus-temperature characteristics;

comparison means for combining the electrical signals generated by said thermoelectric probe and said thermoelectric means to produce a further signal indicative of the difference in amplitude therebetween;

control means responsive to said difference signal for varying the temperature of said thermally conductive medium in a direction to null said amplitude difference;

means, including an electrical bridge circuit normally balanced at a preselected temperature, and having in one arm thereof an element with an electrical parameter that varies in accordance with temperature to which said element is subjected, said element being located in said thermally conductive medium, for indicating the temperature of said medium as an indication of the temperature to which said thermoelectric probe is subjected; and wherein said control means comprises a semiconductor device responsive to said difference signal for actively heating and cooling said medium selectively according to the sense of said difference signal.

2. Apparatus for indicating the temperature of a thermoelectric probe, comprising:

a normally balanced electrical circuit containing a temperature sensitive element for disrupting the balance of said circuit when exposed to a temperature differing from that at which the condition of balance obtains;

thermoelectric transducer means having temperature characteristics matched with the temperature characteristics of said probe, for sensing the temperature to which said element is exposed and for generating a signal functionally related to that temperature;

means for comparing the signals generated by said probe and by said transducer means to provide a difference signal representative of the difference therebetween;

semiconductor means responsive to said difference signal for actively driving the temperature to which said element is exposed selectively upwards and downwards in such sense as to reduce said difference; and means for indicating the degree of unbalance of said circuit as a measure of said probe temperature.

3. In a system for measuring the temperature to which a first thermocouple is exposed, said first thermocouple providing a first output signal having an amplitude as a function of its temperature:

a second thermocouple providing a second output signal having an amplitude as a function of its temperature;

a container for said second thermocouple;

an electrical heat exchanger in said container;

a thermistor in said container;

a mass of nongaseous rapid heat transfer material in said container surrounding said second thermocouple;

said thermistor and said heat exchanger being in immediate thermodynamic proximity, and said heat transfer material bringing these into rapid mutual heat exchange relation, and thereby to the same temperature;

means responsive to the difference between the amplitudes of said signals for providing power to said electrical heat exchanger, said electrical heat exchanger being arranged and adapted selectively to supply and abstract heat according to the sense of said difference and thereby to modify the temperature of said heat transfer material selectively upwards and downwards in such sense as to tend to null said difference by modifying the temperature of said second thermocouple;

a resistance bridge circuit including an indicator of temperature, said bridge circuit including four bridge arms, one of said bridge arms being said thermistor; and a temperature controlled oven containing the remainder of said three arms exclusive of said thermistor.

4. The combination according to claim 3, wherein said electrical heat exchanger is arranged and adapted to insert heat or to abstract heat as a function of sign of electrical voltage applied thereto.

5. The combination according to claim 3, wherein said transfer material is a metal.

6. The combination according to claim 5, wherein said metal is aluminum.

7. A temperature control system, comprising:

a first temperature responsive device for generating a first voltage representative of the temperature of said device:

a second temperature responsive device for generating a second voltage representative of the temperature of said second temperature responsive device;

means responsive to said votages for generating a third voltage having a polarity and amplitude representing the algebraic difference of said first and second signals;

semiconductor means exhibiting the Thompson-Seebeck-Peltier effects for selectively transferring heat from and to one of said temperature responsive devices in response to said third voltage and selectively according to the polarity of said third voltage; and means for indicating the temperature of said one of said temperature responsive devices.

8. The combination according to claim 7, wherein said last means is a temperature sensitive Wheatstone bridge having as one arm a thermistor, and means for maintaining said thermistor at the temperature of said one of said temperature responsive devices.

9. The combination according to claim 8, wherein said temperature responsive devices are thermocouples.